(12) United States Patent
Cifers et al.

(10) Patent No.: US 11,079,064 B1
(45) Date of Patent: Aug. 3, 2021

(54) ACCESSORY MOUNT FOR ENVIRONMENTAL SURFACE

(71) Applicant: Luther Cifers, Amelia, VA (US)

(72) Inventors: Luther Cifers, Amelia, VA (US); Daniel Anderson Newman, Salem, VA (US)

(*) Notice: Subject to any disclaimer, the term of this patent is extended or adjusted under 35 U.S.C. 154(b) by 0 days.

(21) Appl. No.: 16/030,812

(22) Filed: Jul. 9, 2018

Related U.S. Application Data

(60) Provisional application No. 62/585,222, filed on Nov. 13, 2017, provisional application No. 62/530,291, filed on Jul. 9, 2017.

(51) Int. Cl.
*A01K 97/00* (2006.01)
*F16M 13/02* (2006.01)
*A01K 97/10* (2006.01)
*B63B 17/00* (2006.01)

(52) U.S. Cl.
CPC ........... *F16M 13/022* (2013.01); *A01K 97/00* (2013.01); *A01K 97/10* (2013.01); *B63B 17/00* (2013.01); *F16M 2200/024* (2013.01)

(58) Field of Classification Search
CPC .......... F16M 13/022; F16M 2200/024; A01K 97/10; A01K 97/00; A01K 97/06; A01K 91/08; B63B 17/00
USPC .................................. 248/279.1; 43/21.2, 25
See application file for complete search history.

(56) References Cited

U.S. PATENT DOCUMENTS

| | | | | |
|---|---|---|---|---|
| 3,792,829 A | * | 2/1974 | Fickett | A01K 97/10 248/534 |
| 4,586,688 A | * | 5/1986 | Hartman | A01K 97/10 248/538 |
| 4,948,083 A | * | 8/1990 | McNaney, Jr. | A01K 91/08 248/289.11 |
| 5,438,789 A | * | 8/1995 | Emory | A01K 97/10 248/514 |
| 7,007,906 B2 | * | 3/2006 | Slatter | A01K 91/08 114/255 |
| 7,406,795 B1 | * | 8/2008 | Follmar | A01K 97/10 248/534 |
| 7,757,424 B2 | * | 7/2010 | Follmar | A01K 97/10 248/521 |
| 9,326,496 B2 | * | 5/2016 | Chmura | F16M 11/08 |
| 9,671,060 B1 | * | 6/2017 | Cifers | F16M 11/2085 |
| 9,797,544 B1 | * | 10/2017 | Smed | F16M 11/2085 |
| 9,985,579 B2 | * | 5/2018 | Warin | H02S 20/20 |
| 9,999,802 B2 | * | 6/2018 | Kilmon | A63B 7/00 |

(Continued)

*Primary Examiner* — Nkeisha Smith
(74) *Attorney, Agent, or Firm* — Thedford I. Hitaffer; Hitaffer & Hitaffer, PLLC

(57) ABSTRACT

An accessory mount allows accessories to be removably and adjustably mounted to a surface. In an example, the surface may be that of a watercraft, and the accessory may be a fishing rod. The mount may be used with a track fixable to an environmental surface or mounted directed to the environmental surface. When used with a track, a post of the accessory mount releaseably engages the track. Slidable engagement of the post allows lateral or horizontal adjustment of the accessory. An accessory engaging member is adjustable in relation to the post about a horizontal axis and a vertical axis, so that angular and azimuthal rotational adjustments of the accessory are enabled. A single lever is used to make angular and rotational adjustments, and to release the accessory engaging member from the post.

12 Claims, 13 Drawing Sheets

(56) References Cited

U.S. PATENT DOCUMENTS

| | | | |
|---|---|---|---|
| 10,100,971 B2* | 10/2018 | Yun | B60R 11/0241 |
| 10,258,026 B2* | 4/2019 | Thomas | F16M 11/2014 |
| 10,378,690 B2* | 8/2019 | Carnevali | F16M 11/2064 |
| 10,448,626 B2* | 10/2019 | Carnevali | A01K 97/10 |
| 10,527,219 B2* | 1/2020 | Carnevali | F16M 11/14 |
| 10,642,131 B2* | 5/2020 | Elias | F16M 11/242 |
| 2003/0089021 A1* | 5/2003 | Miller | A01K 97/10 43/21.2 |
| 2008/0022578 A1* | 1/2008 | Follmar | A01K 97/10 43/21.2 |
| 2015/0030386 A1* | 1/2015 | Carnevali | F16B 21/02 403/348 |
| 2016/0255823 A1* | 9/2016 | Thomas | A01K 97/10 |
| 2019/0225173 A1* | 7/2019 | Byrne | B60R 19/565 |

* cited by examiner

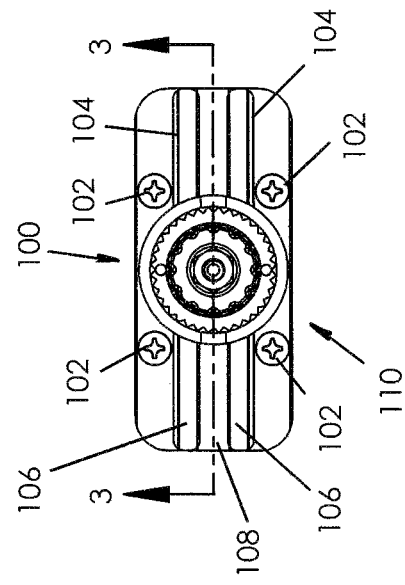
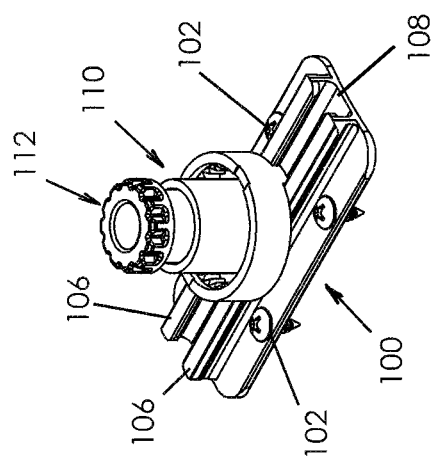
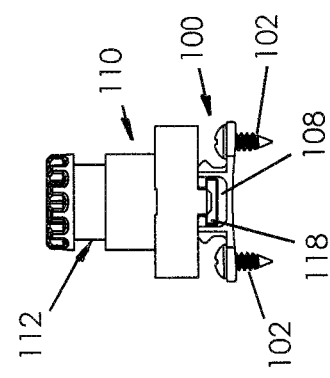
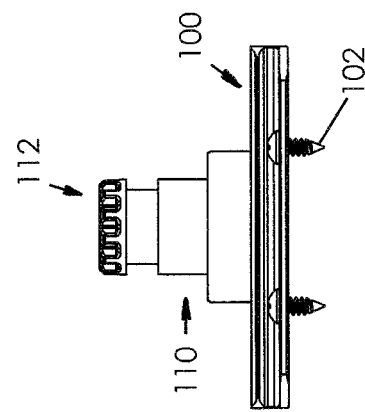
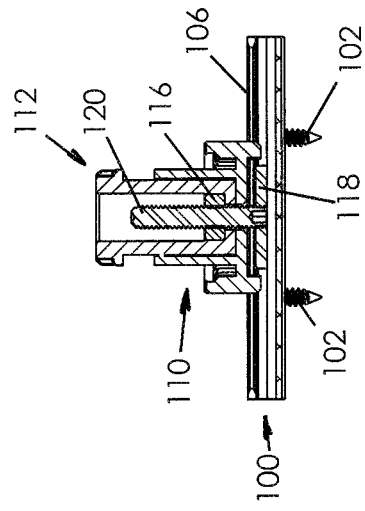

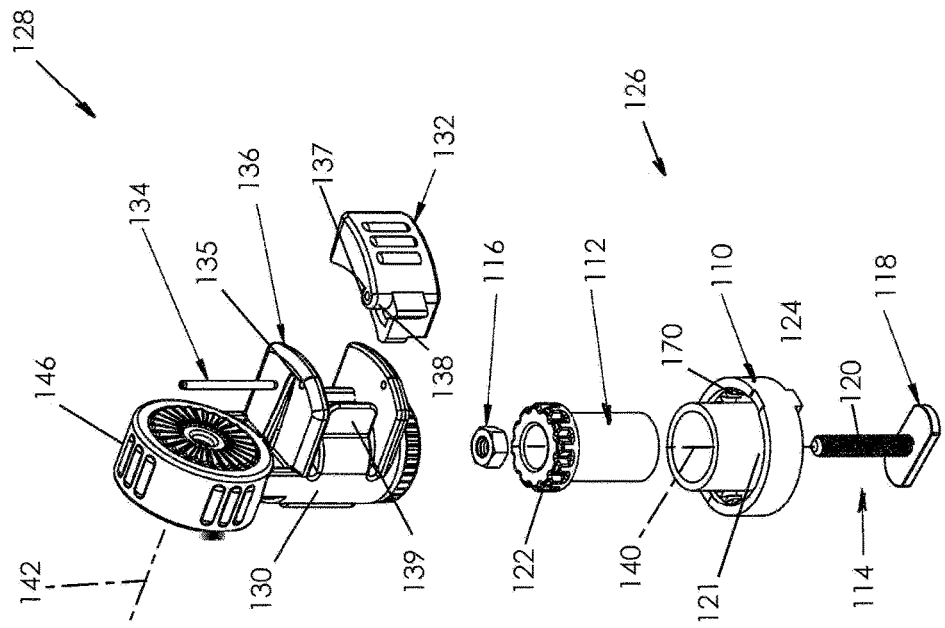

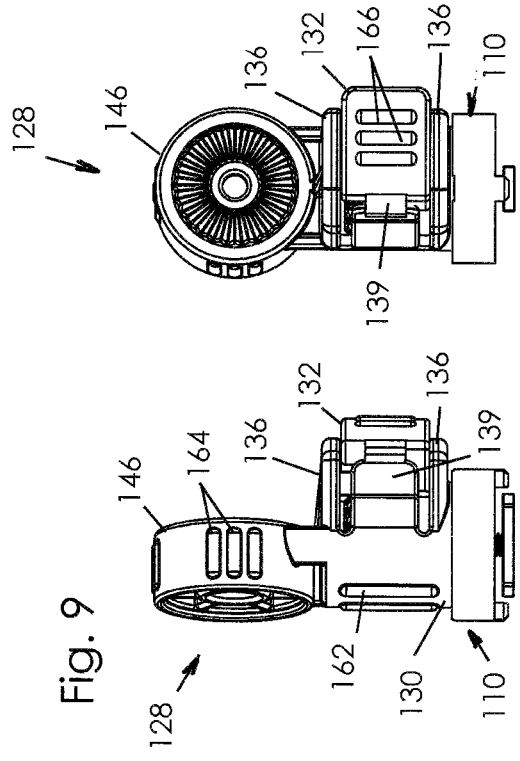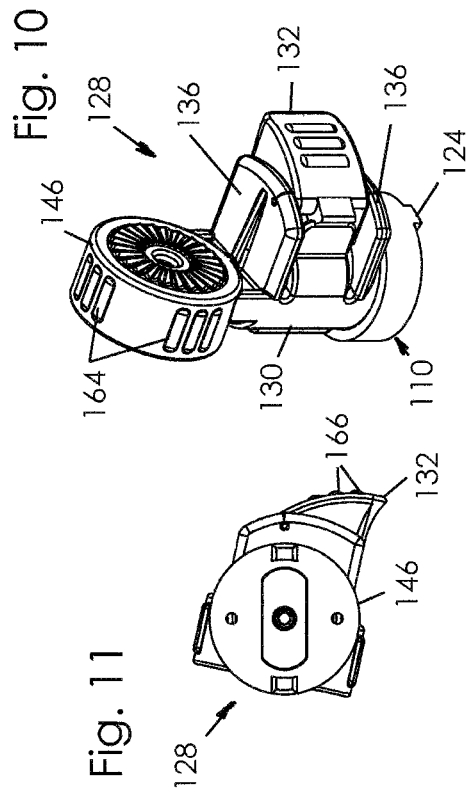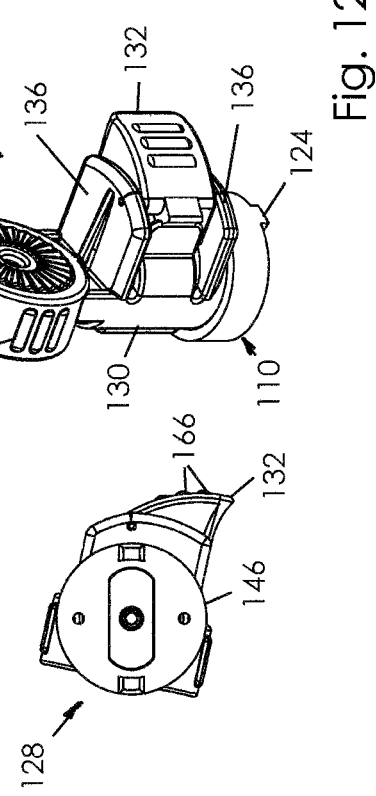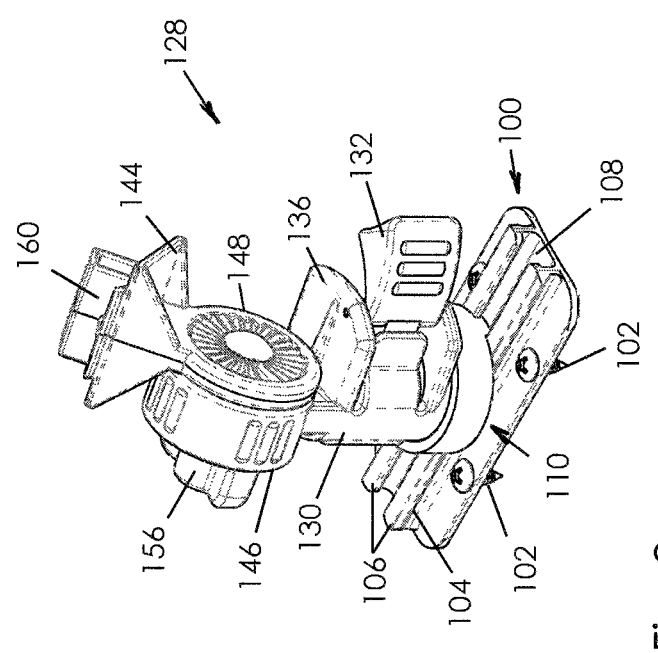

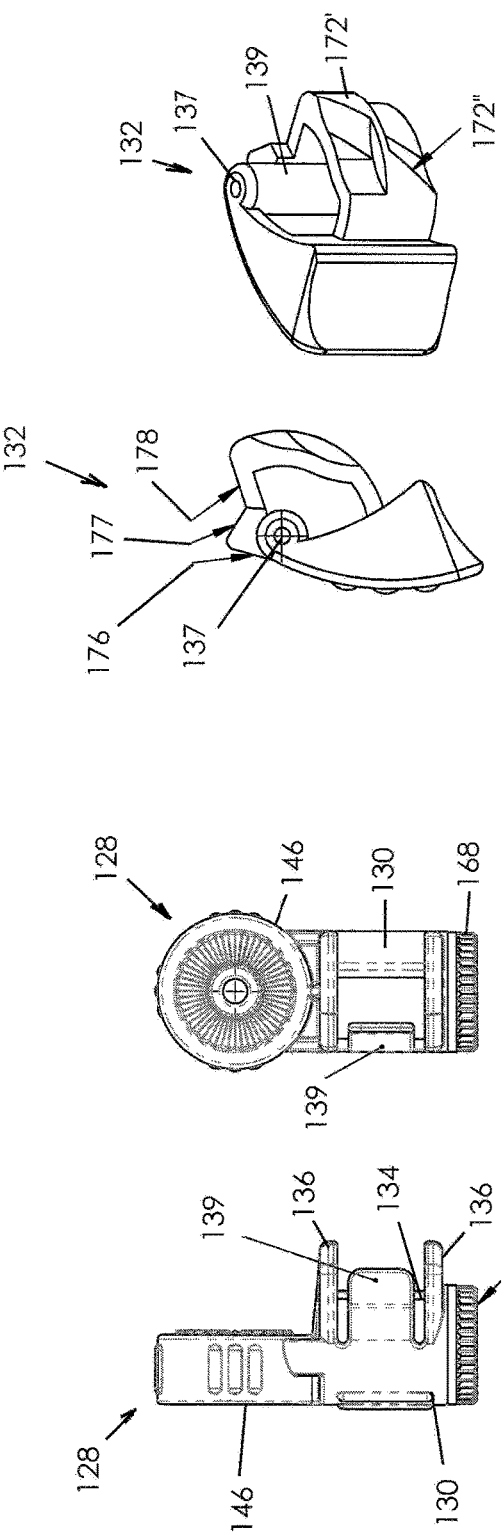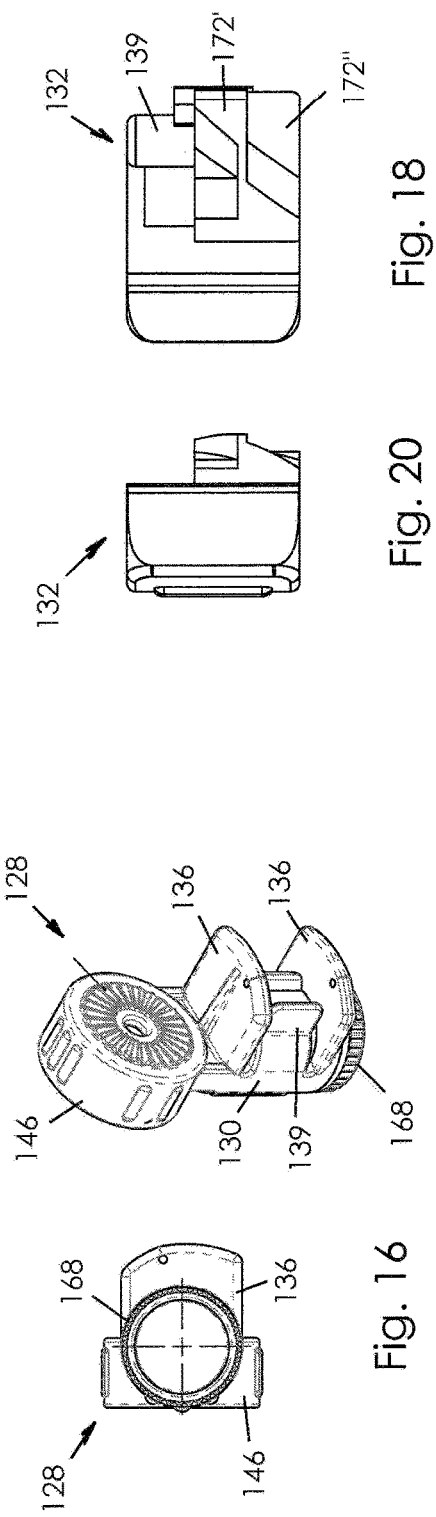

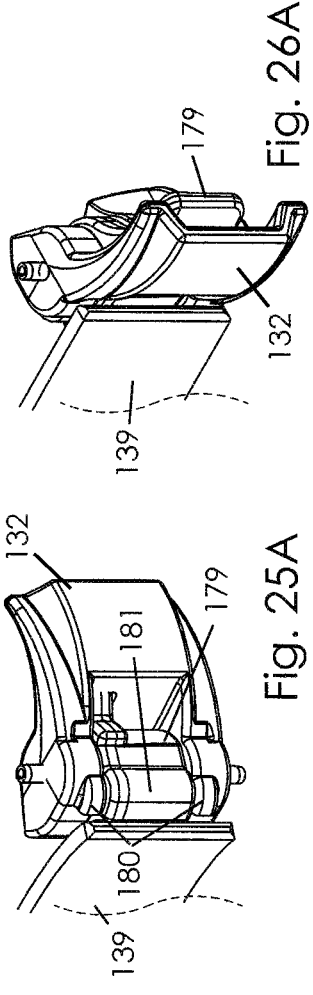
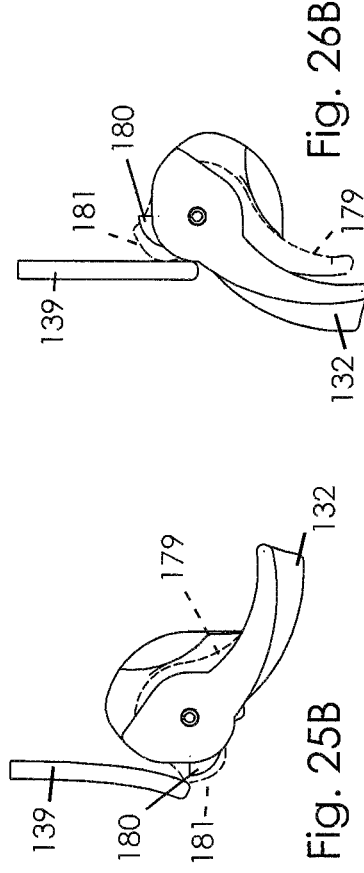
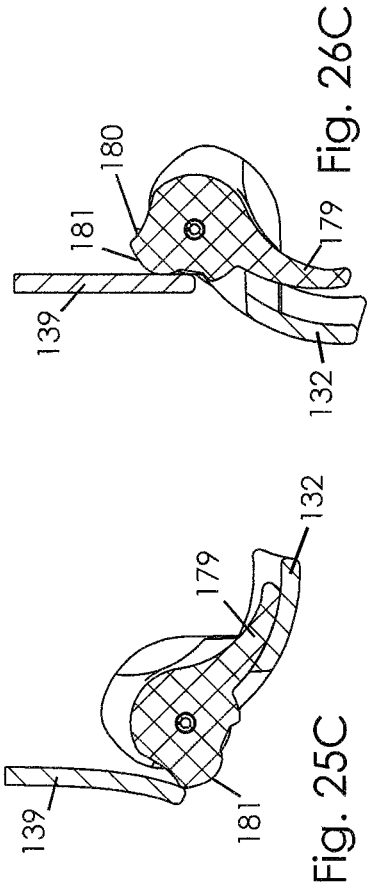
Fig. 24A Fig. 25A Fig. 26A
Fig. 24B Fig. 25B Fig. 26B
Fig. 24C Fig. 25C Fig. 26C

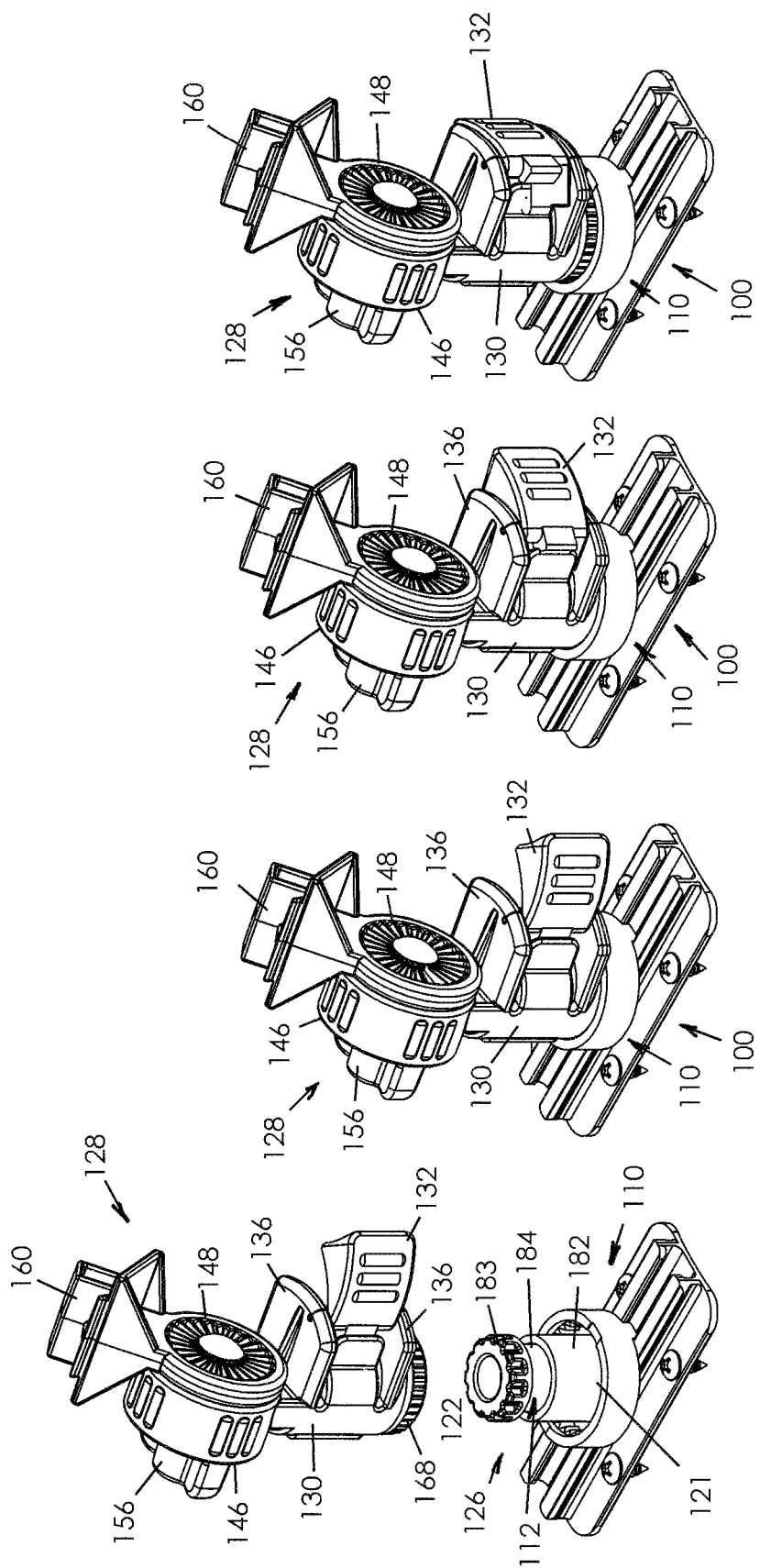

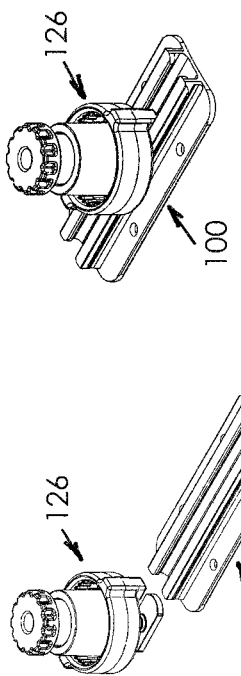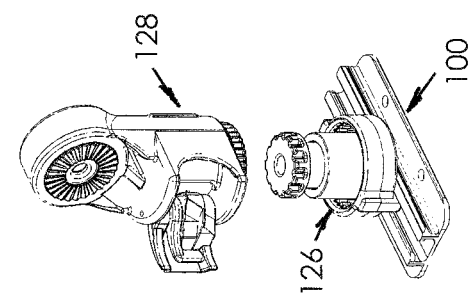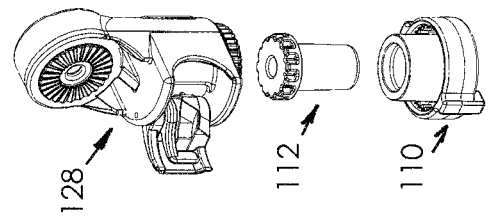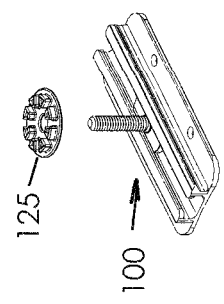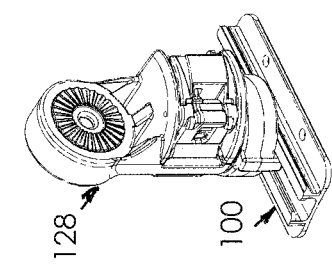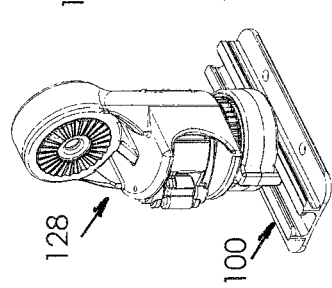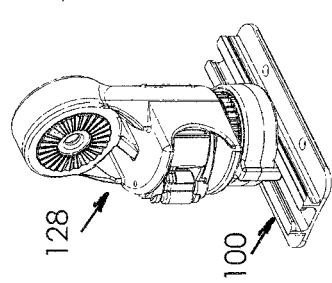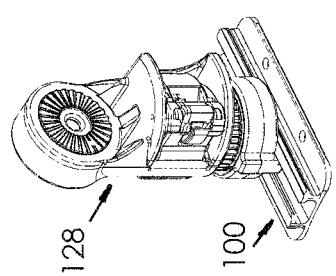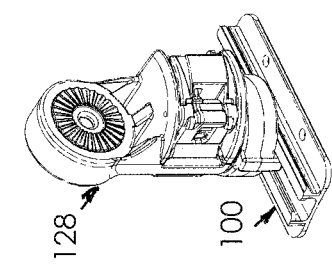

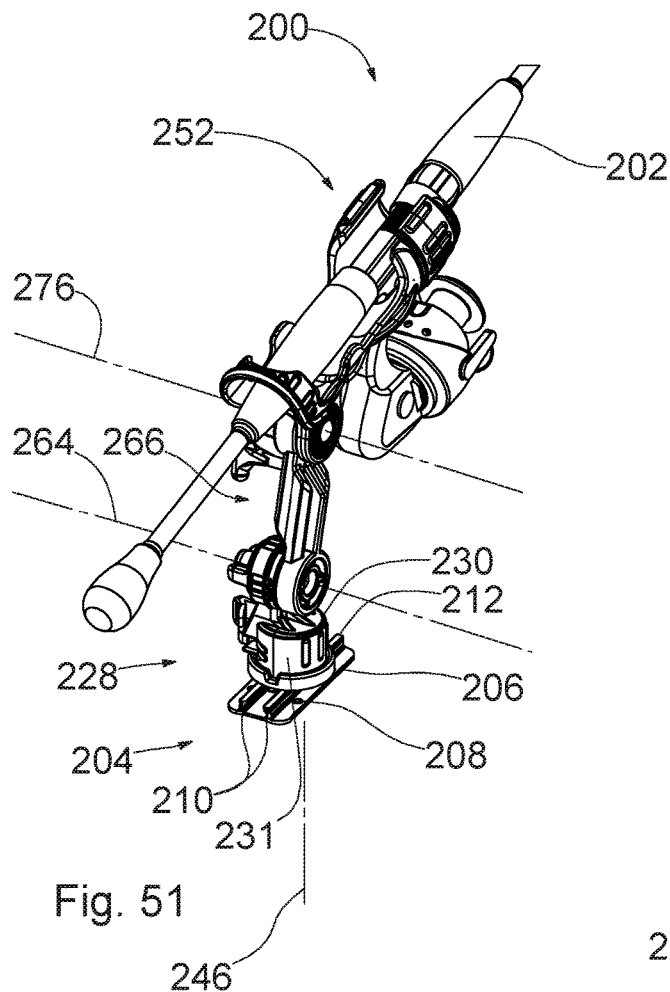
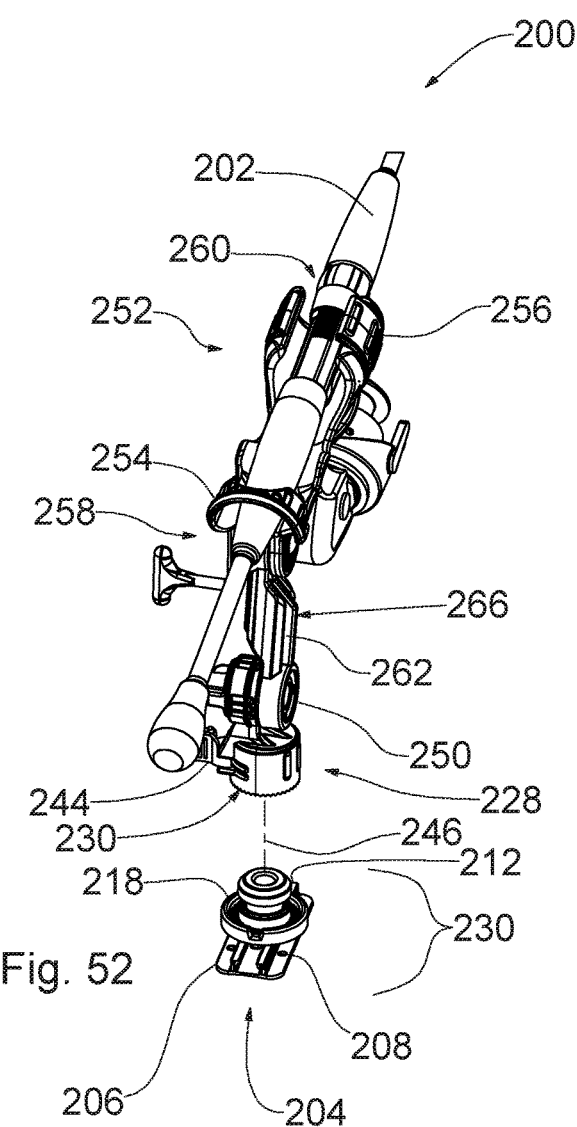
Fig. 51
Fig. 52

US 11,079,064 B1

ACCESSORY MOUNT FOR ENVIRONMENTAL SURFACE

CROSS-REFERENCE TO RELATED APPLICATIONS

This application claims the benefit of U.S. Provisional Application No. 62/530,291, filed Jul. 9, 2017, and U.S. Provisional Application No. 62/585,222, filed Nov. 13, 2017, the disclosures of which are incorporated herein by reference in their entirety.

BACKGROUND OF THE INVENTION

This invention relates in general to mounts for mounting objects in relation to environmental surfaces, such as that of personal watercrafts, and more particularly, to mounts for accommodating use of accessories in connection with environmental surfaces.

Personal watercraft may be improved by providing accommodation of accessories, such as fishing rod holders, fish finders, lights, cameras, diverse tools and others. Preferably, it is desirable to provide a versatile mount, which is readily installable on and removable from a watercraft, and which enables simple adjustment of the position and orientation of particular accessories relative to the watercraft. It is also desirable to enable the mounting of accessories on various surfaces of a watercraft.

SUMMARY OF THE INVENTION

This present invention relates to a mount for accommodating diverse accessories. The system enables positional and orientational adjustments in accessories, without imposing detrimental torques on the mount, and is readily and removably installable in connection with an environmental surface.

The mount comprises a control that is intuitively grasped by a user and easy to manipulate. Notably, a rotational or angular position of an accessory can be releasably secured and adjusted easily with one hand. This is accomplished using a lever action. Moreover, a lever may be used in progressive positions, first, to lock an accessory in place, second, to enable rotation of the accessory, and third, to release the accessory for removal.

The accessory mount of the present invention is configured to receive and retain the accessory and, when the accessory is held by the accessory mount, to independently enable repositioning of the accessory along a track or an environmental surface to which the accessory mount has been fixed, enable rotation of the accessory relative to the track or environmental surface, constrain the accessory against rotation, and enable azimuthal adjustment of the accessory relative to the track or environmental surface.

This system also overcomes imposing torques on the system, which may arise in prior art mounts. These torques may be detrimental to fastening hardware. Even if a mount and a mounted accessory are secured, using typical prior art fasteners, the mount may not inadvertently rotate or slide along a mounting track, where mounting tracks are used. Not only unintended loosening, but also overtightening are eliminated by the present invention.

The present invention provides improved elements and arrangements thereof by providing an apparatus for the purposes described, which is inexpensive, dependable, and fully effective in accomplishing its intended purposes.

Various advantages of this invention will become apparent to those skilled in the art from the following detailed description of the preferred embodiment, when read in light of the accompanying drawings.

BRIEF DESCRIPTION OF THE DRAWINGS

Various objects and features of the present invention will become more fully appreciated as the same become better understood when considered in conjunction with the accompanying drawings, in which like reference characters designate the same or similar parts throughout the several views, and wherein:

FIG. 1 is a perspective view of an accessory mount, according to at least one aspect of the disclosure, supported in relation to a track, which is attachable to an environmental surface, such as a personal watercraft;

FIG. 2 is a top plan view of the system shown in FIG. 1;

FIG. 3 is a side cross sectional view of the system, taken along line 3-3 of FIG. 2;

FIG. 4 is a side elevational view of the system shown in FIG. 1;

FIG. 5 is an end view of the system shown in FIG. 1;

FIG. 6 is an exploded perspective view of the system shown in part in FIGS. 1-5, with the track removed;

FIG. 7 is an exploded perspective view of the system shown in FIGS. 1-6, also showing structure for engaging an accessory;

FIG. 8 is a perspective view showing the system of FIG. 7 fully assembled;

FIG. 9 is a side view of the system shown in FIG. 6 assembled;

FIG. 10 is an end view of the system shown in FIG. 9;

FIG. 11 is a bottom plan view of the system shown in FIG. 9;

FIG. 12 is a perspective view of the system shown in FIG. 9;

FIG. 13 is a side elevational view of an assembly mount of the system shown in FIG. 6;

FIG. 14 is an end view of the assembly mount shown in FIG. 13;

FIG. 15 is a perspective view of the assembly mount shown in FIG. 13;

FIG. 16 is a bottom plan view of the assembly mount shown in FIG. 13;

FIG. 17 is an enlarged perspective view of a lever of the system shown in FIG. 6;

FIG. 18 is a rear elevational view of the lever shown in FIG. 17;

FIG. 19 is a top plan view of the lever shown in FIG. 17;

FIG. 20 is a side elevational view of the lever shown in FIG. 18;

FIG. 24A is a front perspective view of the lever cooperating with the spring tab, and a lever safety release, wherein the lever is in the intermediate position and the lever safety release is not engaged;

FIG. 24B is a top plane view of the lever, spring tab and lever safety release shown in FIG. 24A with the lever safety release shown in broken lines;

FIG. 24C is a cross-sectional view of the lever, spring tab and lever safety release shown in FIG. 24B;

FIG. 25A is a front perspective view of the lever cooperating with the spring tab, and a lever safety release, wherein the lever is in the intermediate position and the lever safety release is engaged;

FIG. 25B is a top plane view of the lever, spring tab and lever safety release shown in FIG. 25A with the lever safety release shown in broken lines;

FIG. 25C is a cross-sectional view of the lever, spring tab and lever safety release shown in FIG. 25B;

FIG. 26A is a front perspective view of the lever cooperating with the spring tab, and a lever safety release, wherein the lever is in the open position;

FIG. 26B is a top plane view of the lever, spring tab and lever safety release shown in FIG. 26A with the lever safety release shown in broken lines;

FIG. 26C is a cross-sectional view of the lever, spring tab and lever safety release shown in FIG. 26B;

FIG. 31 is a perspective view of system shown FIG. 8, with the accessory assembly removed from a base assembly;

FIG. 32 is a perspective view of the system shown in FIG. 31, with the accessory assembly and the base assembly joined together, and with the lever shown in a fully open position;

FIG. 33 is similar to FIG. 32, but shows the lever in an intermediate position, locking the accessory assembly and the base assembly;

FIG. 34 is similar to FIG. 32, but shows the lever in a fully depressed position, enabling rotational adjustment of the accessory assembly about one axis, but otherwise maintaining all the accessory assembly and the base assembly united;

FIG. 35 is a perspective view of the base assembly removed from a track;

FIG. 36 is a perspective view of the base assembly mounted to a track;

FIG. 37 is a perspective view of the base assembly mounted to a track, with the accessory assembly separated from the base assembly;

FIG. 38 is an exploded perspective view of the system removed from the track;

FIG. 39 is a perspective view of the system shown in FIG. 38 mounted to from the track, with the lever in the open position;

FIG. 40 is a perspective view of the system shown in FIG. 39, with the lever in the intermediate position;

FIG. 41 is a perspective view of the system shown in FIG. 39, with the lever in the fully depressed position so as to disengage teeth meshed between the base assembly and the accessory assembly to allow rotation of the accessory assembly;

FIG. 42 is a perspective view of the system shown in FIG. 41, with the accessory assembly rotated in relation to the base assembly;

FIG. 43 is a perspective view of the system shown in FIG. 42, with the lever released back to the intermediate position;

FIG. 51 is an environmental, perspective view of a mounting system and associated holder for supporting an aquatic accessory for a watercraft, according to at least one aspect of the disclosure;

FIG. 52 is an environmental, perspective view of the mounting system of FIG. 1, shown partially exploded.

DETAILED DESCRIPTION OF THE PREFERRED EMBODIMENT

Figure 21:
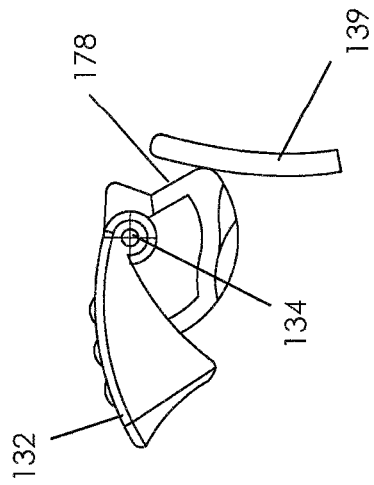
FIG. 21 is diagrammatic representation of the lever shown cooperating with a spring tab when the lever is in an open position.

Referring first to FIG. 1, according to at least one aspect of the invention, there is shown a track 100 attachable to a surface of a personal watercraft or other supporting environment (not shown) by fasteners, such as screws 102. The track 100 may include two rails 104 (referenced in FIG. 2) having mutually facing flanges 106, which establish, or at least partially define, a longitudinally extending slot 108 configured to receive therein a headed fastener (to be described hereinafter), or a corresponding headed engagement member, which may be integral with a component intended to engage the track 100.

The screws 102 and corresponding holes in the track 100 exemplify one of diverse types of fastener arrangements operable to fasten the track 100 to an environmental surface. Similarly, the slot 108 exemplifies one of diverse types of guides determining a slide path along the track 100.

In the present invention, and referring additionally to FIG. 6, the track 100 may receive or cooperate with a base 110 slidable along the slot 108, yet capable of being secured in a desired position along the slot 108. The base 110 supports a post 112 retained by a bolt 114 (i.e., the threaded fastener) securable in place by a nut 116, which fits securely into a pocket in the post 112. The bolt 114 may be a T-bolt having an elongated head 118 configured to slidably engage the slot 108 in close cooperation with the slot 108, and a threaded shank 120 for engaging the nut 116. The bolt 114 and its associated elongated head 118 may be regarded as one form of diverse guided members configured to slidably engage the guide.

FIG. 5 illustrates a close cooperation between the elongated head 118 and the slot 108. The elongated head 118 prevents the bolt 114 from rotating, or restricts rotation of the bolt 114, in relation to the slot 108, and thereby allowing the nut 116 to be tightened in relation to the bolt 114. FIG. 3 shows the nut 116 tightened on the threaded shank 120, thereby pinning the post 112 to the base 110, and clamping the base 110 to the track 100. The base 110 may include drain holes (not shown) to avoid accumulation of liquids within an annular space 121 (see FIG. 6) in the base 110.

The nut 116 may be hexagonal, square, otherwise configured or keyed, or made integral to the post 112 by, for example, threading the post 112 or molding plastic around the nut 116, so that the nut 116 cannot rotate without rotating the post 112. Consequently, rotation of the post 112 rotates the nut 116. That is to say, rotation of the post 112 loosens and tightens the nut 116 in relation to the threaded shank 120 of the bolt 114. The post 112 may be enhanced by treads 122 (see FIG. 6), or other suitable structure to function as a hand grip. The position of the base 110 along the track 100 may be adjusted by loosening the nut 116 and retightening the nut 116 (via rotation of the post 112). When the base 110 has been released from tight engagement with the track 100, rotation of the base 110 relative to the track 100 may be limited by a key, tab or tooth 124 (best seen in FIG. 6), or other suitable structure, which may enter, or cooperate with, the slot 108. In the illustrated embodiment, two radially aligned teeth 124 are provided on opposing sides of the threaded shank 120. Cooperation of the teeth 124 and the slot 108 prohibits the base 110 from rotating in relation to the track 100. It should be understood that rotation of the post 112 in relation to the base 110 loosens and tightens that base 110 in relation to the track 100. As stated above, the elongated head 118 prevents or limits rotation of the bolt 114. This prevents or limits rotation of the bolt 114 while the post 112 is rotated. The post 112 may have features (not shown) to increase grip while tightening or loosening the base 110. A compressible material, such as a rubber washer 125 with engagement features (see FIG. 38), can be used between the track 100 and the base 110 to increase friction to resist movement or translation of the base 110 in the direction of the track 100. This arrangement allows the base 110 to be held in a fixed or secured location in relation to the track 100, while allowing adjustment in the position of an accessory, as will become apparent in the description below.

The bolt 114 and cooperating elements such as the slot 108 may be regarded as a first coupler operable to selectively couple the base 110 to the track 100 in a fixed position and to enable the base 110 to slide in the guide (e.g., the slot 108) along the slide path along the track 100 for repositioning. The first coupler will be seen to include a first keying feature comprising first teeth 170 on the base and second teeth 168 on the accessory mount (via the accessory assembly 128).

FIGS. 7 and 8 show the track 100 and components of an accessory mount removable from the track 100. The base 110, post 112, bolt 114 and nut 116 may be regarded as a base assembly 126 (shown in FIG. 7). Similarly, components shown above the base assembly 126 in FIG. 7 may be regarded as an accessory assembly 128. Just as the base assembly 126 is releasable from the track 100, so is the accessory assembly 128 releasable from the base assembly 126. Generally, the accessory assembly 128 is engageable with an accessory, such as a fishing rod holder, fish finder, lighting equipment, camera, tools, radio, communications electronics, radar, and other items (none shown). The accessory assembly 128 may secure the engaged accessory in a particular orientation relative to the personal watercraft. This orientation may be changed, as will be described hereinbelow.

Referring particularly to FIGS. 6 and 7, but with continued reference to FIGS. 1-5 and 8, the accessory assembly 128 may comprise a structural member 130 to which other components are integrally or removably supported. A lever 132 is pivotally mounted on the structural member 130 via a hinge pin 134, which is supported at opposed ends in bores 135, each supported in relation to one of two structural tabs 136 (best seen in FIG. 6) supported in relation to the structural member 130. The hinge pin 134 may pass through a bore 137 in a boss 138, the latter of which may be an integral part of the lever 132. The lever 132 is pivotally movable among three positions and is biased towards one of these positions by a spring tab 139. The spring tab 139 may be integrally formed with the structural member 130 and may operate using inherent elasticity of its material constituency.

Orientation of an accessory using the novel accessory mount may be adjusted about a vertical axis 140 (see FIG. 6), and independently about a horizontal axis 142 (see FIG. 6). It should be noted at this point that orientational terms, such as vertical and horizontal, refer to the subject drawing as viewed by a viewer. The drawing figures depict their subject matter in orientations of normal use, which could obviously change with changes in posture and position of the novel accessory mount as mounted on the personal watercraft, or other environmental surface. Therefore, orientational terms must be understood to provide a semantic basis for purposes of the description and are not intended to limit the invention or its component parts in any way.

An accessory may be coupled to an accessory holder 144 (shown in FIGS. 7 and 8), which may be part of the accessory assembly 128. A two-part angular adjustment feature is provided by a first toothed member 146, which acts in concert with a complementary second toothed member 148 (also shown in FIGS. 7 and 8).

Unless otherwise indicated, the terms "first", "second", etc., are used herein merely as labels, and are not intended to impose ordinal, positional or hierarchical requirements on features to which these terms are associated. Moreover, reference to, for example, a "second" feature does not either require or preclude the existence of, for example, a "first" or lower-numbered feature, and/or, for example, a "third" or higher-numbered feature.

The first and second toothed members 146, 148 each have respective radial teeth. The radial teeth are configured to mesh with each other so that upon being angularly or rotationally adjusted about a horizontal axis 142, the first and second toothed members 146, 148 can be pressed into mutual engagement at a selected angular or rotational position of the first toothed member 146 in relation to the second toothed member 148, and thus index and lock the rotation of the accessory holder 144 in relation to the accessory assembly 128. Alternatively stated, the first and second toothed members 146, 148 and related components are one of a number of forms of an elevation angle adjuster enabling the accessory holder 144 to move to different elevation angles. The first and second toothed members 146, 148 may be clamped in mutual engagement by a bolt 154 threadably engageable with a threaded knob 156. The latter may have wings 158 (FIG. 7) to facilitate tightening and loosening. The bolt 154 and its associated components, and first and second toothed members 146, 148 collectively serve as one implementation of an elevational angle adjuster lock operable to lock the elevational angle adjuster at a selected elevational angle relative to the track 100, and to release the elevation angle adjuster from the selected elevation angle. Note that the first coupler comprises threaded knob 156, the latter rotatable about an axis perpendicular to the track 100, and a threaded shaft (e.g., the bolt 154) projecting from the guided member (e.g., the bolt 114) about an axis perpendicular to the track 100.

The accessory holder 144 may include an engagement structure 160 (FIGS. 7 and 8) for advantageously cooperating with and engaging an accessory. The engagement structure 160 may be designed to cooperate with surfaces of the accessory or may be a feature integral to the accessory. Alternative engagement structures may comprise, for example, a flat surface (not shown), optionally bearing slots and threaded holes for receiving fasteners to secure the accessory to the novel accessory mount, or other suitable fastening structure.

FIGS. 9-12 show diverse views of the accessory assembly 128 mounted to the base 110, with the track 100 and accessory holder 144 omitted from view. FIG. 9 shows treads 162 on the structural member 130. FIGS. 9 and 12 show treads 164 on the first toothed member 146. FIGS. 10 and 11 show the treads 166 on the lever 132.

FIGS. 13-16 show the accessory assembly 128 from various angles, with the lever 132 omitted from the view. Teeth 168 on the structural member 130 are clearly shown. The teeth 168 are configured to slide axially to mesh with the teeth 170 (shown in FIGS. 6 and 7) on the base 110, within the annular space 121. Meshing of the teeth 168 and 170 prevents the accessory assembly 128 from rotating about the vertical axis 140 (shown in FIGS. 6 and 7) relative to the base 110. When the accessory mount is assembled, as seen, for example, in FIG. 8, the accessory assembly 128 can be released from engagement with the base 110, by using the lever 132. Hence the lever 132 and its associated components may be regarded as a second coupler operable to selectively couple the accessory holder 144 to the base 110. The accessory holder 144 may be coupled as part of the accessory assembly 128, or in other implementations, by itself.

Turning to FIGS. 17-20, but with continued reference to FIGS. 1-16, the lever 132 includes threads 172', 172", which, for example, may be centered at the axis of the bore 137, and which are engageable with the base 110 and the post 112. Upon rotating the lever 132, the threads 172', 172" raise and lower the accessory assembly 128. The threads 172', 172" are seen squarely facing the observer in FIG. 18. Rotating the lever 132 to a fully depressed position raises the accessory assembly 128 sufficiently to disengage the interlocking teeth 168 and 170 and allow rotation of the accessory assembly 128 in relation to the base 110. In the fully depressed position, the lever 132 pushes against the spring tab 139, which resists the rotation of the lever 132, so when released, the accessory assembly 128 is driven back down to reengage the teeth 168 and 170. It should be appreciated that the teeth 168 and 170 index rotation of the accessory assembly 128 in relation to the base 110.

Figure 22:
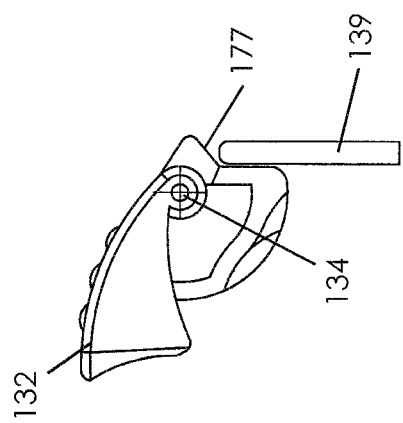
FIG. 22 is diagrammatic representation of the lever shown cooperating with a spring tab when the lever is in an intermediate position.
Figure 23:
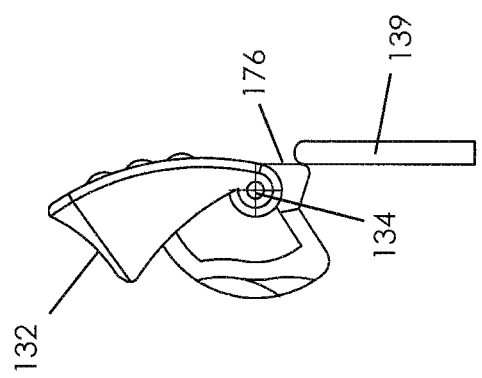
FIG. 23 is a diagrammatic representation of the lever shown cooperating with a spring tab when the lever is in a fully depressed position.
Figure 30:
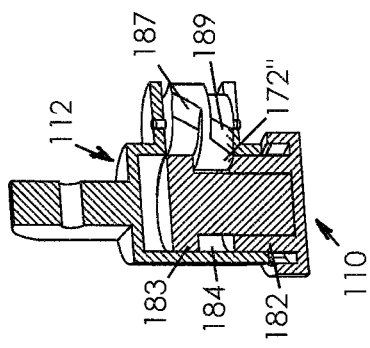
FIG. 30 is a diagrammatic representation of the system with the lever in the fully depressed position.
Figure 29:
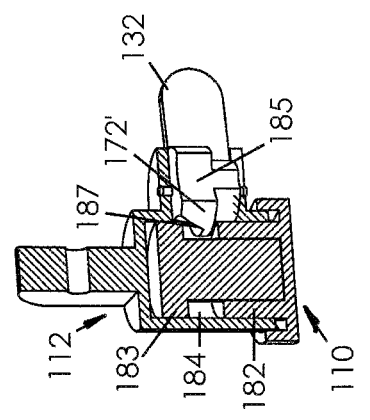
FIG. 29 is a diagrammatic representation of the system with the lever in the intermediate position.
Figure 28:
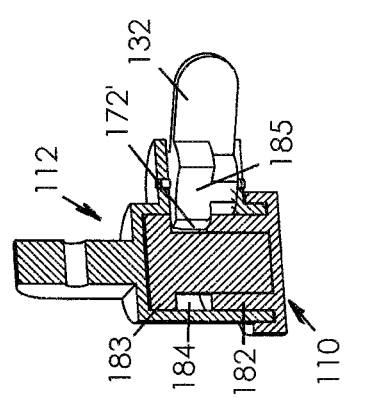
FIG. 28 is a diagrammatic representation of the system with the lever moved toward the intermediate position.
Figure 27:
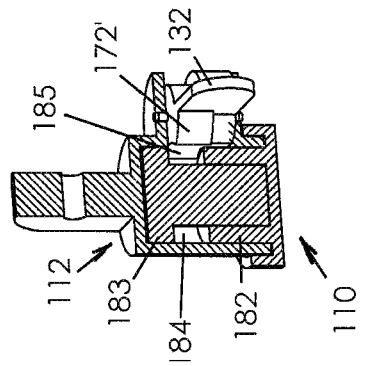
FIG. 27 is a diagrammatic representation of the system with the lever in the open position.

The cooperation of the spring tab 139 with the lever 132 to load the spring tab 139 is diagrammatically represented in FIGS. 21-23, which shows surfaces 176, 177, 178 of the lever 132. The surfaces 176, 177, 178 engage the spring tab 139, and by the geometry of the surfaces 176, 177, 178, and their respective cooperation the spring tab 139, the spring tab 139 is loaded cause the lever 132 to assume one of three rotational or angular positions about the axis of the hinge pin 134. The axis of the hinge pin 134 is represented in FIG. 19 by cross hairs over the bore 137. In a fully open position (see FIG. 21), the spring tab 139 engages a first surface 176 of the lever 132 to bias the lever 132 to the fully open position. Through the application of force to overcome this bias (i.e., the load on the spring tab 139), the lever 132 can be moved to the intermediate position (see FIG. 22). In this position, the spring tab 139 acts upon a second surface 177 of the lever 132 to center the lever 132 in the intermediate position. From this position, with the application of force (i.e., the overcome the force of the spring tab 139), the lever 132 can be moved back to the fully open position or moved to the fully depressed position (see FIG. 23). In this fully depressed position, the spring tab 139 acts upon a third surface 178 of the lever 132 to bias the lever 132 back to the intermediate position.

The mount may be provided with a lever safety release 179, as shown in FIGS. 24A-27C. The lever safety release 179, in cooperation with the lever 132 and spring tab 139, prevents the lever 132 from being inadvertently moved to the open position, to reduce the risk of losing an accessory. Essentially, the lever 132 may not be moved to the open position unless the lever safety release 179 is operated prior to and simultaneously with the operation of the lever 132. In FIGS. 24A-24C, the lever 132 is in the intermediate position. In this embodiment, we can see that the lever 132 is equipped with upper and lower catches 180, that engage or shoulder against the end of the spring tab 139 to prevent displacement of the lever 132, and thus, to prevent movement of the lever 132 to the open position. The lever safety release 179 shares the hinge pin 134 with the lever 132, and is nested within the lever 132, accessible from behind the lever 132 (i.e., such as by finger actuation). The lever safety release 179 may be provided with a cam surface 181, which is shown to be situated between the upper and lower catches 180. The lever safety release 179 may be actuated by force against the spring tab 139, from behind the lever 132 (i.e., in a downward direction when viewing FIGS. 25B and 25C). Actuation or displacement of the lever safety release 179 causes the cam surface 181 to cam against the spring tab 139, moving or displacing or deflecting the spring tab 138 out of engagement with the catches 180, as shown in FIGS. 25A-25C. With the catches 180 clear from engagement with the end of the spring tab 139, the lever 132 is free to move to the open position, unencumbered by the interference between the catches 180 and the end of the spring tab 139. It should be appreciated that a lever 132 or lever safety release 179 may be in some other suitable configuration. For example, the spring tab 139 may have extensions that engage the lever 132 in a similar fashion as described above with reference to the drawings. The teeth 168, 170 and their associated components, possibly including the lever 132, represent one form of an indexing adjuster releasably positioning the accessory holder 144 at a selected azimuthal angle relative to the track 100, The lever 132 and optionally, the lever safety release 179 represent one form of an indexing adjuster lock operable to maintain the indexing adjuster in the selected azimuthal angle, and to release the indexing adjuster from the selected azimuthal angle. The indexing adjuster lock comprises a first keying feature interlocking the accessory mount to the base 110. The first keying feature comprises first teeth 170 on the base 110 and second teeth 168 on the accessory mount (e.g., on the accessory holder 144). The first teeth 170 are arranged along a circle; the second teeth 168; are arranged along a circle; and the first teeth 170 are parallel to and mesh with the second teeth 168. Hence the accessory holder 144*t* must be lifted from the base 110 to disengage the first teeth 170 from the second teeth 168 to rotate the accessory holder 144 (via the accessory assembly 128) relative to the base 110. Thus, unintended rotation of the accessory relative to the base 110 is precluded.

The operation of the invention is represented in FIGS. 27-30. Although, for purposes of simplification, some features may appear to be different from those shown throughout the other drawings, the operation is the same. The base 110 includes a collar 182 surrounding the post 112. The post 112 includes an enlarged head 183 including the treads 122. Because the post 112 has a smaller diameter than the collar 182 and the enlarged head 183, a relatively narrow groove 184 is provided between the collar 182 and the enlarged head 183. The lever 132 may be rotated to a fully open position (see FIG. 27). In this position, the threads 172', 172" are withdrawn from the groove 184. The lever 132 is provided with clearance 185 that permits the accessory assembly 128 to be lifted or removed from the base assembly 126 (see FIG. 31). The threads 172', 172" occupy the groove 184 when the lever 132 is in an intermediate or fully depressed position (see FIGS. 29 and 30). When the lever 132 is rotated to the intermediate position (see FIG. 26), an upper thread 172' occupies the groove 184. In this position, the accessory assembly 128 cannot be removed from the base assembly 126. Moreover, the upper thread 172' engages the groove 184 to hold the accessory assembly 128 into engagement with the base assembly 126. As the lever 132 is moved to the fully depressed position, a transition is made from the upper thread 172' to a lower thread 172", via inclined planes, or ramped or sloped surfaces 187, 189 (see FIGS. 29-30). The sloped surface 189 cams against the base 110 to move the accessory assembly 128 upward in relation to the base assembly 126, in a direction away from the track 100 (i.e., along the vertical axis 140 shown in FIG. 7), causing the teeth 168 of the accessory assembly 128 to disengage from the teeth 170 of the base 110 (see FIG. 30). In this position, the accessory assembly 128 may be rotated or adjusted about the vertical axis 140. Upon releasing the lever 132, the spring tab 139 biases the lever 132 back to the intermediate position, shown in FIG. 28 (i.e., the lower thread 172" ceases to occupy the groove 184 while the upper thread 172' resumes engagement with the groove 184).

The operation of the invention continues to be explained with reference to FIGS. 31-34. In FIG. 31, the lever 132 is shown in the fully open position, with the accessory assembly 128 removed from the base assembly 126. As stated above, in this position, the lever 132 is held in the fully open position by the spring tab 139 (see FIG. 21) and the threads 172', 172" are withdrawn from the groove 184 (see FIG. 27). This allows the accessory assembly 128 to be readily removed from the base assembly 126, as shown in FIG. 31, and reengaged with the base assembly 126 (see FIG. 32).

In FIG. 33, the accessory assembly 128 is shown engaging the base assembly 126, and the lever 132 is shown in an intermediate position. As stated above, the lever 132 is held in this position by the spring tab 139 (see FIG. 22). In this position, rotation of the accessory assembly 128 relative to the base 110 is prevented, as the teeth 168, 170 remain meshed together. Also, the accessory assembly 128 is prevented from being displaced along the vertical axis 140 due to engagement of the upper threads 172' with the groove 184 (shown in FIG. 29). It should be appreciated that the threads 172', 172" do the lifting and lowering, and the upper flat surface of the threads 172', 172" retains the accessory assembly 128 in a corresponding position.

In the fully depressed position of the lever 132 shown in FIG. 34, the accessory assembly 128 may be elevated (i.e., moved along the axis 140) to the point that the teeth 168, 170 disengage from one another, thereby enabling rotational adjustment of the accessory assembly 128. Disengagement of the accessory assembly 128 is prevented by engagement of the lower threads 172" of the lever 132 with the groove 184 (shown in FIG. 30).

In summary, FIG. 34 illustrates a position of use of the accessory mount wherein the accessory assembly 128 and any accessory coupled thereto may be angularly adjusted but are precluded from inadvertent loss. FIG. 33 shows the intermediate position of the lever 132 wherein angular adjustment and vertical displacement of the accessory assembly 128 and its associated accessory are prevented. FIG. 32 shows the open position of the lever 132 enabling removal of the accessory assembly 128 from the base 110, as shown in FIG. 31.

It should be appreciated that the base assembly 126 (shown separate from the track 100 in FIG. 35, may be easily mounted to the track 100, as shown is FIG. 36. In FIG. 37 the accessory assembly 128 is shown separate from the base assembly 126. In FIG. 38, the mount is shown in separate parts or components, with a textured rubber washer 125 interposed between the base 110 and the track 100 to reduce the risk of the base 110 moving inadvertently in relation to the track 100. In FIG. 39, the system is shown assembled, with the lever 132 in the open position to allow the accessory assembly 128 to be removed from the base assembly 126. In FIG. 40, the lever 132 is in the intermediate position to prevent the accessory assembly 128 from being removed from the base assembly 126. In FIG. 41, the lever 132 is fully depressed to allow the accessory assembly 128 to rotate in relation to the base assembly 126. In FIG. 42, the accessory assembly 128 is rotated in relation to the base assembly 126. In FIG. 43, with the lever 132 release, the lever 132 is biased back to the intermediate position, while the accessory assembly 128 lowers to permit the teeth 168 of the accessory assembly 128 to mesh with the teeth 170 of the base assembly 126, to prohibit rotation of the accessory assembly 128. In this position, the threads 172' engage the groove 184 to prevent the accessory assembly 128 from being removed.

It should be appreciated that the rotational position of an accessory can be fixed securely and easily adjusted with one hand and returned to a secure and fixed location. This invention provides a strong and stable mount that allows either hand to depress the lever 132 to allow rotation, release the lever 132 to lock rotation, and in either case the system remains securely fastened to the slotted track 100. To release the accessory assembly 128 from the base assembly 126, actuating the lever 132 to an "open" position allows removal. Lowering the accessory assembly 128 onto the secured base assembly 126 and actuating the lever 132 from the "open" position to the "closed" position locks the accessory assembly 128 in relation to the track 100, where again rotation of the accessory assembly 128 is accomplished by squeezing the lever 132.

The present invention does not allow torque on the accessory to result in rotation of the accessory, which would be communicated to the base 110, causing fastening hardware to tighten or loosen. This would result in the accessory and mount being inadvertently oriented at an undesired angle, sliding inadvertently along the slot in the track, or becoming too tight to remove without the use of tools. The invention limits the rotation that can be transmitted to the base 110, preventing loosening or over-tightening. Additionally, the invention prevents rotation regardless of temperature changes, mating parts becoming wet, and other adverse conditions.

It should be appreciated that the track 100 may be a self-supporting track, such as an extruded aluminum track, or slotted track profile that is mounted to or integral with a substrate, such as a boat hull, truck bed, table, or other mounting surface. The base 110 may be keyed to a track slot in a variety of track systems. Radially oriented teeth 168 and 170 are preferably oriented vertically with respect to the accessory assembly 126 and the base 110 and to prevent normal forces from allowing ratcheting of the accessory mount. The radially oriented teeth 168 and 170 and the cooperation of the teeth 124 of the base 110 with the track slot 108 prevent rotation of the accessory. It should also be appreciated that the post 112 and the base 110 combine when fastened to track 100 to form a groove 184 having an upper and a lower surface and an interior diameter and an outer diameter. The outer diameter of the groove 184 communicates with the inner diameter of the accessory assembly 128 to create an axle about which the accessory assembly 128 can rotate when not engaged in the teeth 170 of the base 110.

Figure 45:
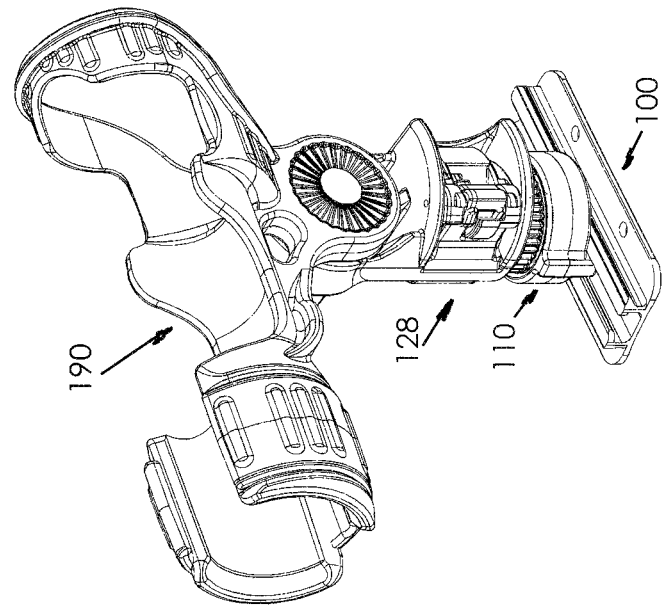
FIG. 45 is a perspective view of the system shown in FIG. 42, supporting an accessory.
Figure 44:
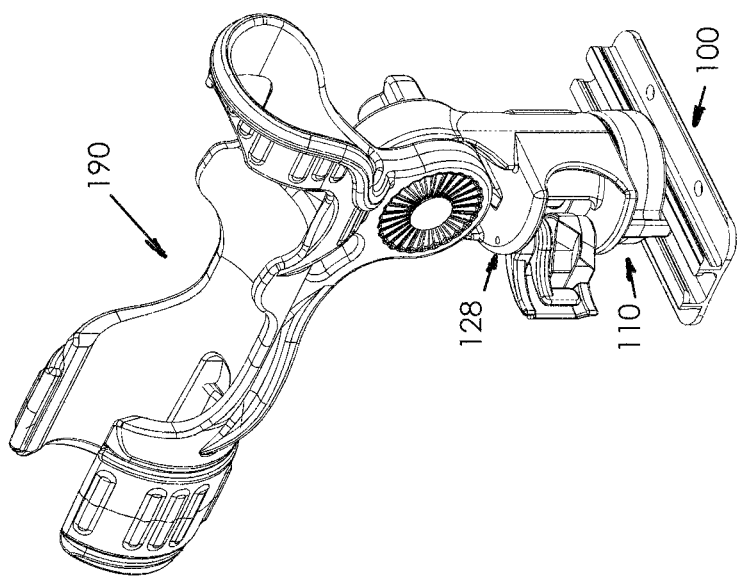
FIG. 44 is a perspective view of the system shown in FIG. 40, supporting an accessory.
Figure 46:
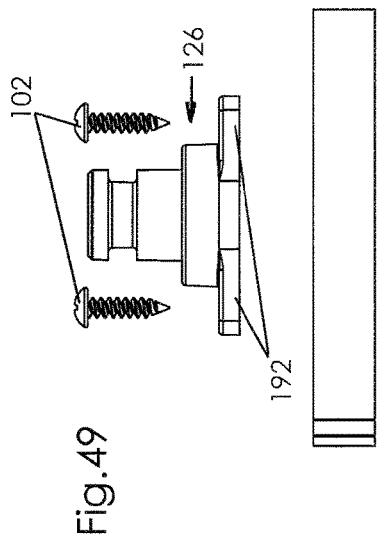
FIG. 46 is a top plan view of an exemplary base assembly with exemplary flanges for mounting the base assembly to an environmental surface.
Figure 49:
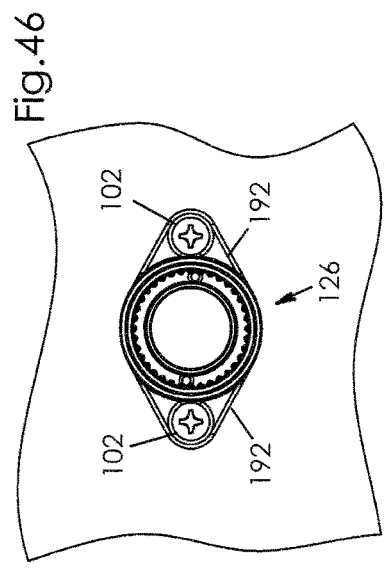
FIG. 49 is an exploded plan view of the base assembly shown in FIG. 47.
Figure 47:
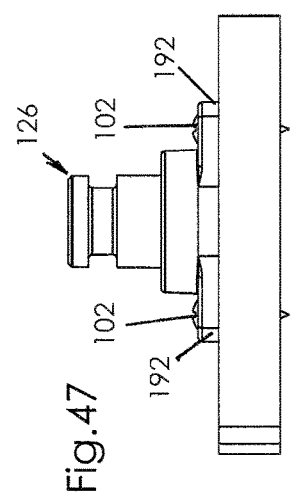
FIG. 47 is a side elevational plan view of the base assembly shown in FIG. 46.
Figure 50:
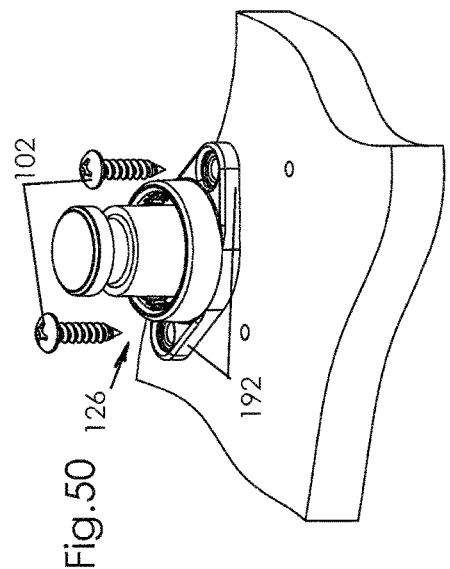
FIG. 50 is a perspective view of the base assembly shown in FIG. 49.
Figure 48:
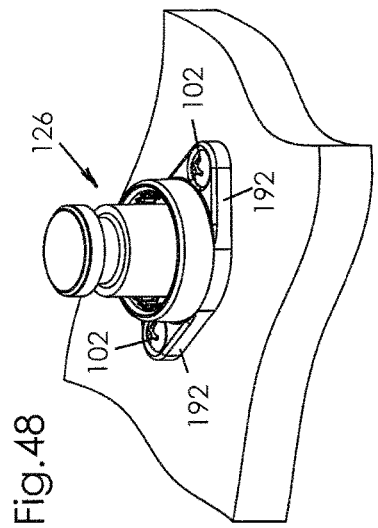
FIG. 48 is a perspective view of the base assembly shown in FIG. 47.

FIGS. 44-45 show the mount supporting an accessory in the form of a fishing rod holder 190. It should be understood that the rod holder 190 may be removed, together with the accessory assembly 128, with the lever 132 in the open position, as shown in FIG. 44. With the lever in the fully depressed position, the direction of the accessory assembly 128, and thus, the rod holder 190, may be changed, as shown in FIG. 45.

It should also be appreciated that the base assembly 126 may be mounted directly to a supporting surface in the absence of a track. For example, as shown in FIGS. 46-50, the base assembly 126 may be provided with flanges 192, or other suitable mounting structure, with mounting holes, for receiving fasteners, such as screws 102, for mount the base assembly 126 directly to a supporting surface. It should be understood that the flanges may be of a different shape, and more screws may be provided for securing the base assembly 126 in relation to the supporting surface.

It should further be appreciated that although the description of the invention has been presented with reference to application to personal watercraft, those of skill in the art will recognize that there has been presented an accessory mount suitable from other environmental surfaces, both mobile and stationary.

The present invention is susceptible to modifications and variations, which may be introduced thereto without departing from the inventive concepts. For example, construction of the base assembly 126 and the accessory assembly 128 may be modified such that rotational adjustments about the vertical axis are contained within the base assembly 126, rather than within the accessory assembly 128. Similarly, the lever or components providing clutching functions securing the base assembly 126 to the accessory assembly 128 or both may be relocated to the former. Also, components providing angular adjustment of the accessory about horizontal and vertical axes may be switched from those locations shown herein.

Also, noting that the base 110 and the first coupler are shown as part of the base assembly 126, and the accessory holder 144, the second coupler, the elevation angle adjuster, the elevational angle adjuster lock, the indexing adjuster, and the indexing adjuster lock are shown as part of the accessory assembly 128, other constructions are possible. Any of the forelisted components may be separate from the base assembly 126 or accessory holder 144, or part of the other of the base assembly 126 or accessory holder 144, where feasible.

Figure 53:
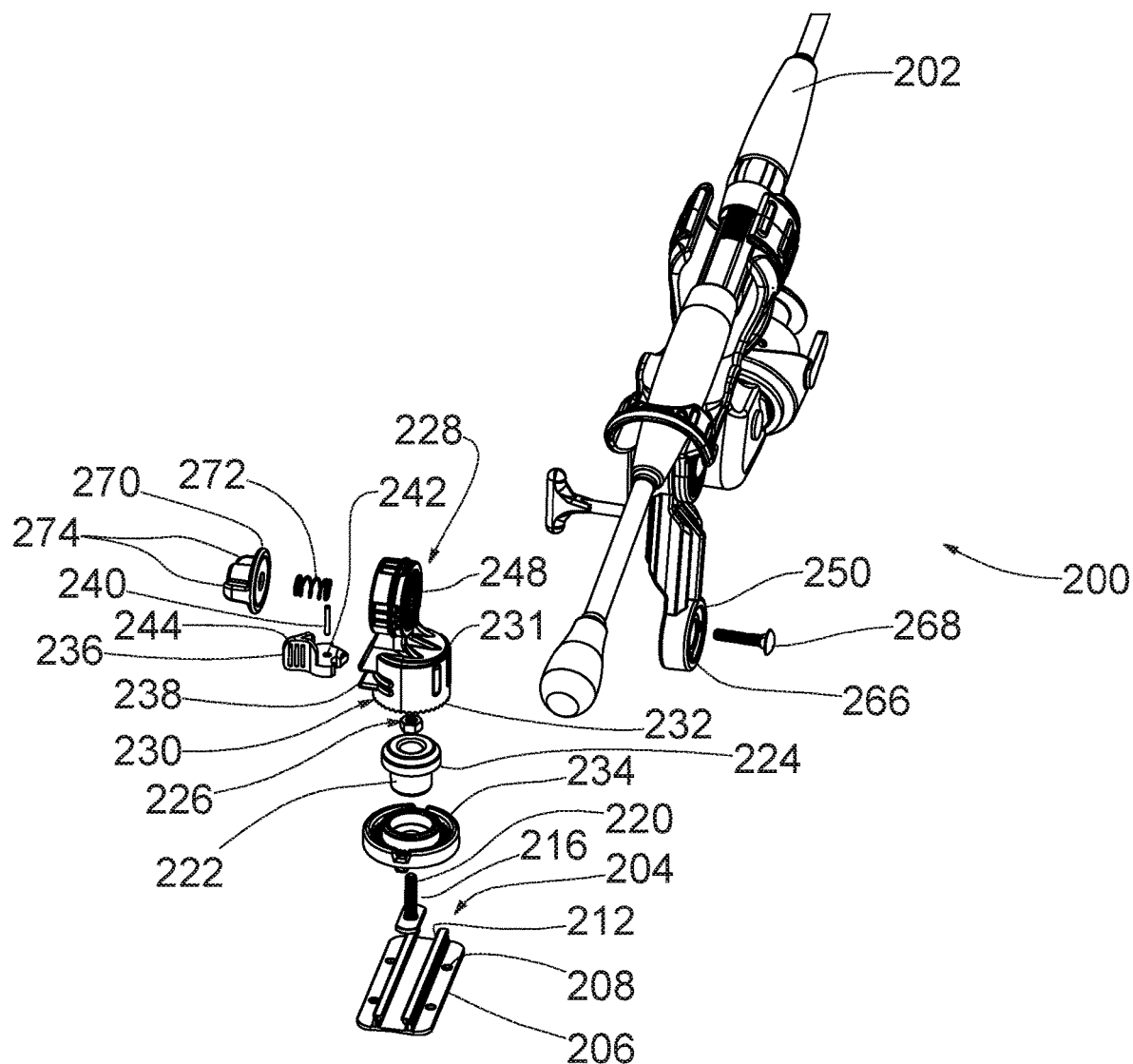
FIG. 53 is an environmental, perspective view of the mounting system of FIG. 1, showing additional components in exploded view.

Now with reference to FIGS. 51-53, there is illustrated in the drawings a mounting system 200 for mounting an object to and supporting the object on a surface of a watercraft (not shown). In the particular example illustrated, the object is a fishing pole 202. Additionally, referring particularly to FIG. 53, a track 204 includes a flat, planar base 206 bearing holes 208 for receiving fasteners (not shown) to enable fixing the track 204 to the surface of the watercraft. The surface may be a hull or body surface for example. Two low walls 210 project upwardly from the planar base 206. Low walls 210 include mutually facing flanges 212.

A T-headed bolt 214 is dimensioned and configured to be received between low walls 210 and flanges 212. Once slightly rotated, an elongated head 216 of the T-headed bolt 214 will underlie the flanges 212 and will be constrained from lifting away from the base 206 by interference with the flanges 212. In assembly of the mounting system 200, a pivot track 218 is lowered over a shank 220 of the T-headed bolt 214, the latter passing entirely through the pivot track 218. A retainer 222 is lowered against the pivot track 218 such that a lip 224 of the retainer 222 provides a downwardly facing interference surface to be described hereinafter.

A nut 226 is tightened onto the shank 220. The nut 226 seats inside an open center of the lip 224 and draws the elongated head 216 upwardly, thereby causing the flanges 212 to be pinched between the elongated head 216 and either the pivot track 218 or the lip 224. Pinching or clamping pressure may be sufficient to prevent rotation of the pivot track 218 about the shank 220. The base 206, pivot track 218, and retainer 222 may be regarded as a pivot base 230 (shown assembled and in isolation in FIG. 52).

A two-axis member 228 is then assembled to the pivot base 230. Best seen in FIG. 53, the two-axis member 228 includes a downwardly projecting skirt 231 which fits over and can rotate about the lip 224. A lower edge 232 of the skirt 231 may be received within a circular channel 234 in the pivot track 218.

The two-axis member 228 is retained on the pivot base 230 in the following way. Still referring particularly to FIG. 53, a retention plate 236 is slid into a slot 238 such that the retention plate 236 is entrapped between the lip 224 and the pivot track 218. A pin 240 is driven through a hole 242 in the retention plate 236 to enable the latter to pivot into interference fit with the lip 224 and the pivot track 218, and to be withdrawn from interference fit. The retention plate 236 is moved into and out from an engaged position, wherein the retention plate 236 is held by interference fit, by a thumb lever 244. The thumb lever 244 may have ridges (not called out by reference numeral to preserve clarity of the view) to improve frictional engagement of a user's thumb (not shown).

Optionally, the skirt 231 or lower edge 232 of the two-axis member 228, and the pivot track 218 or retainer 222 may be provided with interfitting teeth (not shown), so that loosening the nut 126 will not immediately enable unintended or spontaneous rotation of the two-axis member 228 relative to the pivot base 230. Rather, it may be necessary to separate the relevant components and perform rotation by hand.

It will be appreciated that the pivot base 230 can pivot about a vertical axis 246 (see FIG. 51). Such pivot adjusts an azimuth angle (not shown) of the fishing pole 202. An elevation angle of the fishing pole 202 is adjusted as follows.

The two-axis member 228 has a rotation guide 248 which cooperates with a holder guide 250 of a pole cradle 252. Particularly called out in FIG. 52, the pole cradle 252 may comprise a first pole holding arm 254 and a second pole holding arm 256. The fishing pole 202 may be inserted into the pole cradle 252 by passing the fishing pole 202 laterally into an open center of the first pole holding arm 254 through a first slot 258. The fishing pole 202 is also inserted into the pole cradle 252 by passing the fishing pole 202 downwardly into an open center of the second pole holding arm 256 through a second slot 260. It will be appreciated that with one slot (e.g., first slot 258) opening laterally as shown in FIGS. 51, 52, and 53, and with another slot (e.g., second slot 260) opening upwardly as shown in FIGS. 51, 52, and 53, the fishing pole 202 may be held by gravity and will resist being spontaneously dislodged from the pole cradle 152.

Best seen in FIG. 52, the pole cradle 252 is secured to the pivot base 230 by an arm 262. The arm 262 terminates in the holder guide 250. In one embodiment of the invention, the pole cradle 252, holder guide 250, and arm 262 are rigidly fixed to one another, and may be monolithically fabricated by molding from a plastic material, for example. Where fabricated as one monolithic assembly, the pole cradle 252, holder guide 250, and arm 262 may be referred to as a pole cradle assembly 266.

Referring particularly to FIG. 53, the rotation guide 248 of the two-axis member 228 rotationally cooperates with the holder guide 250 in the following way. Once pressed into mutual engagement, the rotation guide 248 and the holder guide 250 rotate relative to one another about an axis 264 (see FIG. 51). Mutual engagement may be established for example by interfitting teeth (not shown) formed in the rotation guide 248 and the holder guide 250. Adjustment of the two-axis member 228 relative to the rotation guide 248 establishes an elevation angle of the fishing pole 202. The rotation guide 248 and the holder guide 250 are maintained in mutual engagement by a screw 268 threading into a cap 270. A spring 272 resists ability of the cap 270 to loosen spontaneously. When adjusted manually, the cap 270 is rotated by pressing on ears 274, separating the rotation and holder guides 248 and 250, realigning the rotation and holder guides 248 and 250, and retightening the cap 270.

It would also be possible to provide a rotationally adjustable joint (not shown) in the pole cradle assembly 266 to enable adjustment of the elevation angle about an axis 276. Such a joint may be in addition to or alternatively, in place of rotational adjustment provided by the rotation guide 248 and the holder guide 250. The rotationally adjustable joint may also be used to rotate the first pole holding arm 254 into contact with the fishing pole 202 to more securely engage the latter.

While the invention has been described in terms of supporting a fishing pole 202 to the watercraft, other objects could be supported thereinstead. Such objects may be elongated as is the fishing pole 202 or may be otherwise configured. To accommodate supported objects other than fishing pole 202, the pole cradle 252 may be modified accordingly.

While the present invention has been described in connection with what is considered the most practical and preferred embodiment, it is to be understood that the present invention is not to be limited to the disclosed arrangements, but is intended to cover various arrangements, which are included within the spirit and scope of the broadest possible interpretation of the appended claims so as to encompass all modifications and equivalent arrangements that are possible.

While the invention may have been described herein in terms of certain features being referred to in either the singular or the plural, other arrangements are possible. For example, it is to be understood that due to the conceptual description presented herein, components presented in the singular may be provided in the plural, and vice versa.

The accessory mount and component parts thereof may be comprised of a substantially rigid and lightweight material, such as aluminum or plastic or hardened rubber, or other materials or a composite comprising two or more materials. The surface of the mount and component parts thereof may be treated for harsh environmental exposure, such as UV radiation and saltwater. Engaging surfaces may have a texture to improve the gripping characteristics thereof, where desired, which may increase resistance to slippage, either by rotation or linearly. Such a texture may be the result of geometry in the surface, such as ridges or grooves in the surface. Alternately or in addition to this geometry, texture may be the result of etching, application of plastic or rubberized coating, or other surface treatments.

The features disclosed in the foregoing description, in the following claims and/or in the accompanying drawings may, both separately and in any combination thereof, be material for realizing the invention in diverse forms thereof.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An accessory mount comprising:
a base assembly,
an accessory assembly releasable from the base assembly, and
a rotatable actuator supported in relation to the accessory assembly and rotatable between at least three positions including a first position to prevent the accessory assembly from being removed from the base assembly and prevent rotation of the accessory assembly in relation to the base assembly, a second position to prevent the accessory assembly from being removed from the base assembly and permit rotation of accessory assembly in relation to the base assembly and a third position to permit the accessory assembly to be removed from the base assembly, and
wherein the actuator is pivotally mounted in relation to the accessory assembly, the actuator being pivotally movable to the first, second and third positions about an axis of rotation and biased towards the first, second and third positions by a spring tab supported in relation to the accessory assembly.

2. The accessory mount of claim 1, wherein the spring tab cooperates with corresponding surfaces on the actuator to load the spring tab to cause the actuator to assume one of first, second and third angular positions about the axis of rotation.

3. An accessory mount comprising:
a base assembly configured to be supported in relation to a mounting surface,
an accessory assembly releasable from the base assembly, the accessory assembly being engageable with an accessory, and
an actuator rotationally engageable with the base assembly and operable to prevent the accessory assembly from being released from the base assembly, the actuator being biased towards first, second and third positions by a spring tab supported in relation to the accessory assembly,
wherein a safety release is configured to cooperate with the actuator and the spring tab to prevent movement of the actuator to the first position unless the safety release is operated prior to or simultaneously with the actuator.

4. The accessory mount of claim 3, wherein the safety release comprises a cam surface, wherein the safety release is actuatable by force applied against the spring tab, which causes the cam surface to cam against the spring tab, moving the spring tab out of engagement with catches, which permits the actuator to move to the first position.

5. The accessory mount of claim 4, wherein actuator and the safety released are configured to be operated with one hand.

6. An accessory mount comprising:
a base assembly configured to be supported in relation to a mounting surface,
an accessory assembly releasable from the base assembly, the accessory assembly being engageable with an accessory, and
an actuator rotationally engageable with the base assembly and operable to prevent the accessory assembly from being released from the base assembly, wherein a lever is operable in three positions, including a first position to prevent the accessory assembly from being released from the base assembly and a second position to allow the accessory assembly to be released from the base assembly,
wherein the actuator comprises threads engageable with the base assembly, wherein upon rotating the actuator, the threads raise and lower the accessory assembly, and wherein rotating the actuator to a third position raises the accessory assembly to disengage teeth on the accessory assembly and teeth on the base assembly and allow rotation of the accessory assembly in relation to the base assembly.

7. The accessory mount of claim 6, wherein upon releasing the actuator, the accessory assembly is biased to reengage the teeth on the accessory assembly and the teeth on the base assembly.

8. An accessory mount comprising
a base assembly,
an accessory assembly releasable from the base assembly, and
a rotatable actuator supported in relation to the accessory assembly and rotatable between at least three positions including a first position to prevent the accessory assembly from being removed from the base assembly and prevent rotation of the accessory assembly in relation to the base assembly, a second position to prevent the accessory assembly from being removed from the base assembly and permit rotation of accessory assembly in relation to the base assembly, and a third position to permit the accessory assembly to be removed from the base assembly, and
a safety release configured to cooperate with the actuator to prevent movement of the actuator to the first position unless operated prior to or simultaneously with the actuator.

9. The accessory mount of claim 8, wherein the actuator and the safety released are configured to be operated with one hand.

10. An accessory mount comprising:
a base assembly configured to be supported in relation to a mounting surface,
an accessory assembly engageable with an accessory,
a rotatable actuator engageable with the base assembly and rotatable in progressive positions, including a first position wherein the accessory assembly is locked in place with the base assembly to prevent the accessory assembly from being released from the base assembly, a second position wherein the accessory assembly is prevented from being removed from the base assembly and is permitted to be rotationally adjustable in relation to the base assembly, and a third position wherein the accessory assembly is releasable and reengageable with the base assembly, and
a safety release configured to cooperate with the actuator to prevent movement of the actuator to the first position unless operated prior to or simultaneously with the actuator.

11. The accessory mount of claim 10, wherein the actuator and the safety released are configured to be operated with one hand.

12. An accessory mount comprising:
a base,
an accessory releasable from the base, and
an actuator operable in at least three positions, inducing a first position wherein the actuator permits the accessory to be removed from the base, a second position wherein the actuator cooperates with the accessory and the base to prevent the accessory from being removed from the base and permits rotational adjustment of the accessory in relation to the base, and a third position whereto the actuator cooperates with the accessory and the base to prevent the accessory from being removed from the base and to restrict rotation of accessory in relation to the base,
wherein a spring tab cooperates with corresponding surfaces on the actuator to load the spring tab to cause the actuator to assume one of first, second and third angular positions about an axis of rotation.

* * * * *